April 2, 1957  R. M. BALMER  2,787,099
LAWN MOWER GRINDING APPARATUS
Filed Dec. 28, 1953  5 Sheets-Sheet 2

INVENTOR
RALPH MAX BALMER

ATTORNEYS

April 2, 1957 R. M. BALMER 2,787,099
LAWN MOWER GRINDING APPARATUS
Filed Dec. 28, 1953 5 Sheets-Sheet 4
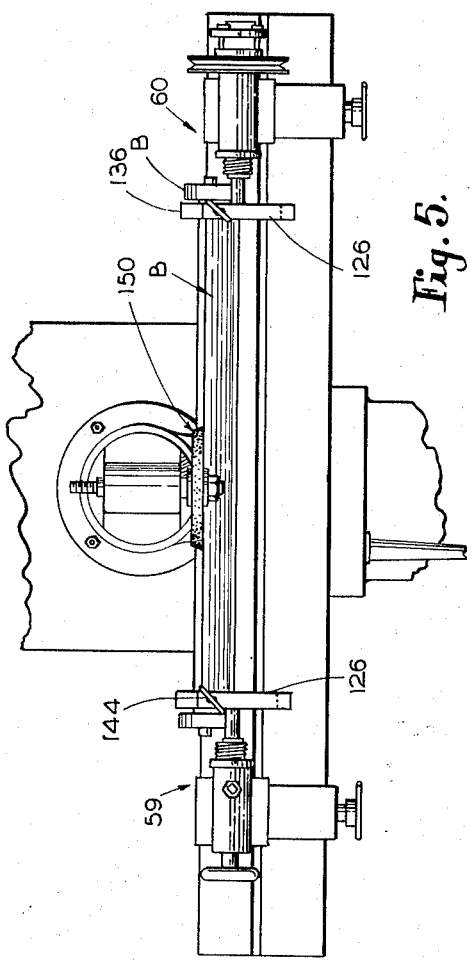
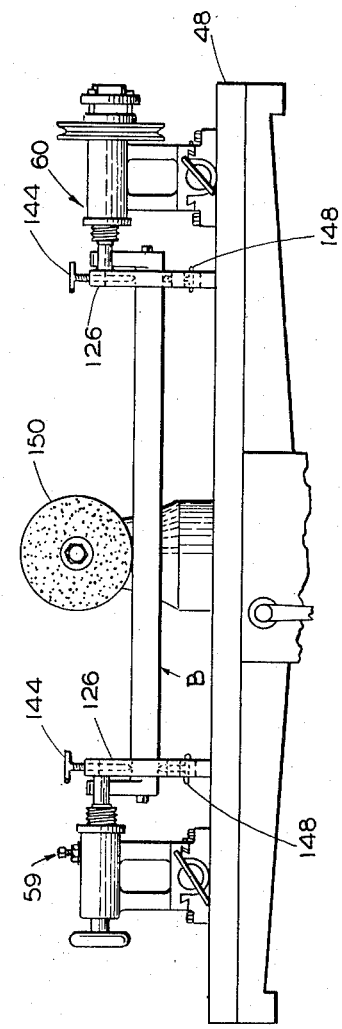
INVENTOR
RALPH MAX BALMER
Jewell, Mead, Browne
& Schuyler
ATTORNEYS

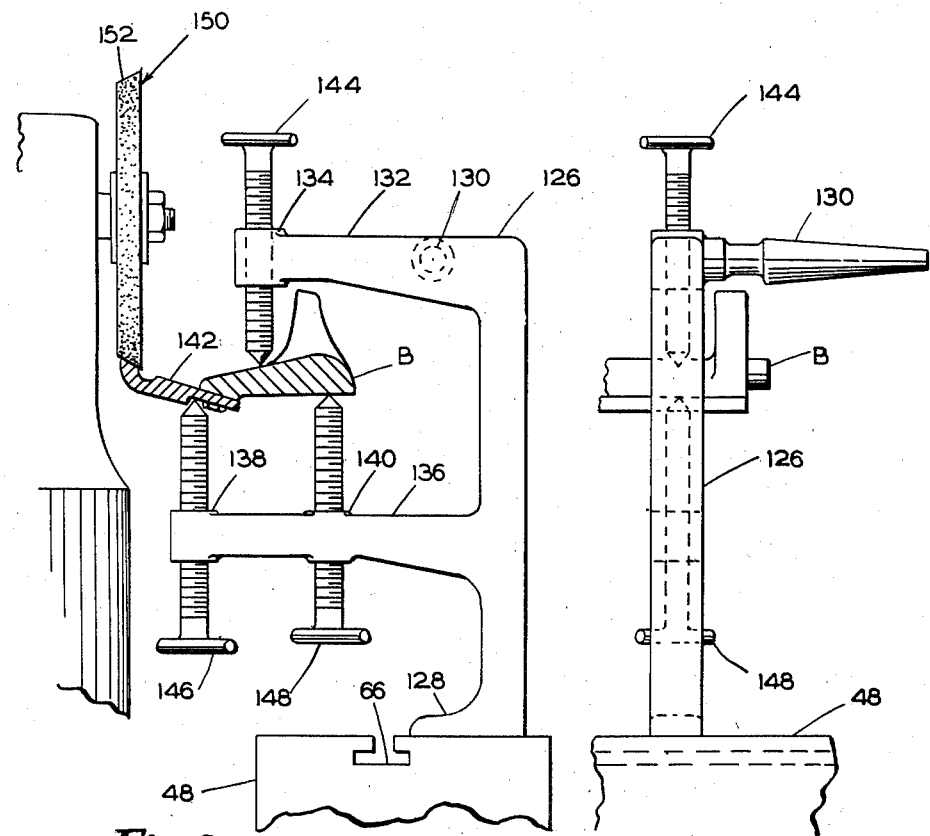

United States Patent Office 2,787,099
Patented Apr. 2, 1957

2,787,099

LAWN MOWER GRINDING APPARATUS

Ralph Max Balmer, Clinton, Iowa

Application December 28, 1953, Serial No. 400,485

3 Claims. (Cl. 51—232)

This invention relates to a grinding apparatus and more particularly to a grinding machine primarily adapted for use in sharpening the blades of reel type lawn mowers and their associated ledger bar blade.

While various grinding machines are known for sharpening the blades of a reel type lawn mower, the known machines of this type are generally quite complicated in their structure and have no way of accurately insuring that all blades are uniformly sharpened to the same radial distance from their bearing center. An illustration of such a machine is that shown in Patent No. 1,667,064, Yerkey, which is quite complicated in its structure and accordingly quite expensive to sell. Furthermore, the apparatus in the patent just mentioned sharpens only one of the reel blades at a time and requires an escapement mechanism for indexing the successive blades into sharpening position.

Accordingly, it is an object of this invention to provide a grinding machine for sharpening the blades of reel type lawn mowers which is simple in construction and operation and much less expensive to manufacture and sell than previously known grinding machines.

It is another object of this invention to provide a grinding machine in which the sharpening action occurs while the lawn mower reel is revolving on its own bearings to thereby insure that all reel blades are uniformly ground to the same radial distance from the bearing center of the lawn mower reel.

It is still another object of the invention to provide a lawn mower grinding machine in which the lower or stationary blade held by the ledger bar of the lawn mower can be sharpened.

In achievement of these objectives, this invention provides a grinding apparatus in which a lawn mower reel is supported for rotation by a pair of oppositely disposed chuck members mounted on a longitudinally movable work carriage. A source of motive power, such as an electric motor, is mounted on the work carriage and is connected to the lawn mower reel in such manner as to revolve the reel when the motor is energized. A rack and pinion gear means is provided for manually reciprocating the work carriage longitudinally with respect to a bed frame. A grinding wheel is mounted for rotation adjacent the outer periphery of the reel blades and is supported by a hollow vertical standard. Separate motor means are provided for rotating the grinding wheel. Means are also provided for vertically and laterally adjusting the position of the work carriage, and thus of the lawn mower reel being ground, with respect to the rotatable grinding wheel.

The invention, both as to its organization and use, together with further objects and advantages thereof, may best be understood by reference to the following description taken in connection with the accompanying drawings in which:

Fig. 5 is a plan view of the grinding apparatus as it appears when used for grinding the ledger bar blade of a reel type lawn mower;

Fig. 6 is a front elevation of the apparatus shown in Fig. 5;

Fig. 7 is a front elevation, partially cut away, of the structure used for supporting a ledger bar during the grinding operation; and Fig. 8 is an end elevation of the structure shown in Fig. 7.

Figure 1:
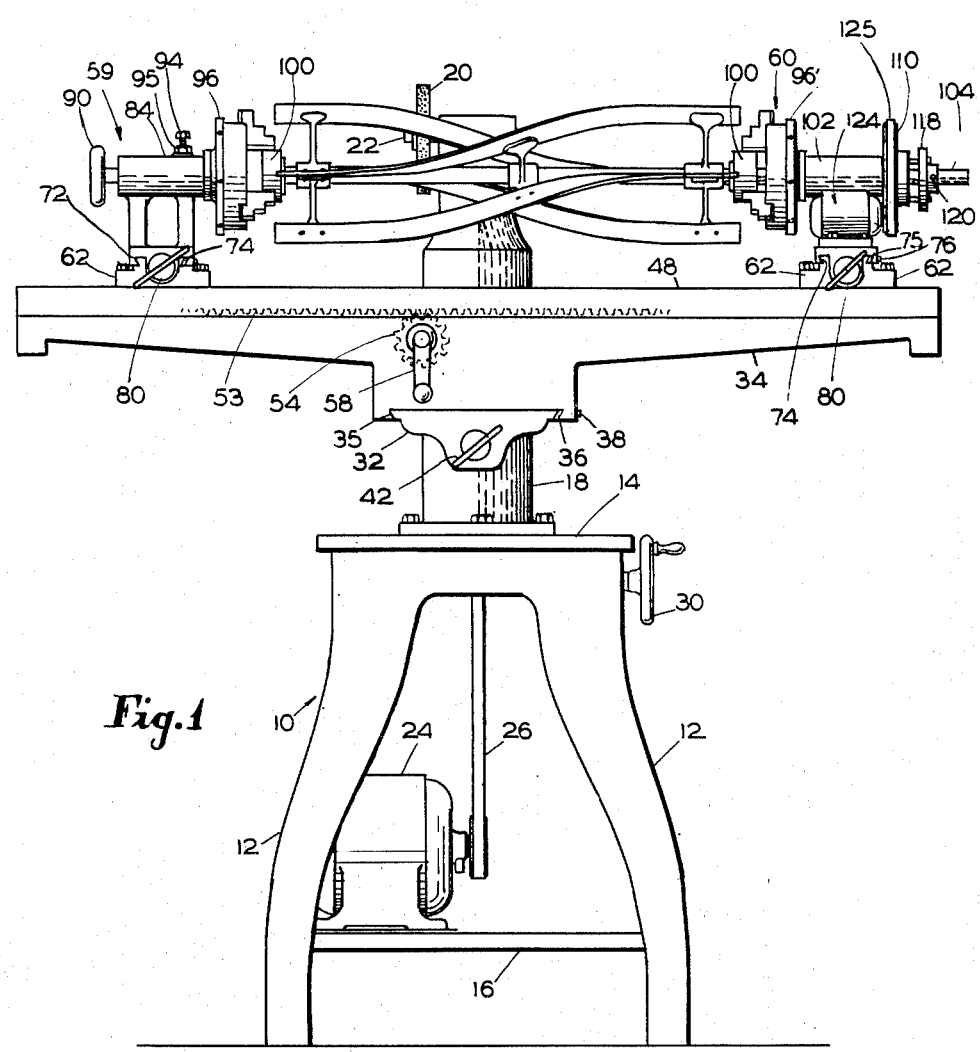
Fig. 1 is a front elevation of a grinding machine in accordance with the invention.

Referring now to the drawings, the grinding apparatus of the invention is mounted on a supporting stand or base generally indicated at 10 and comprising legs 12, an upper horizontal surface 14, and a horizontally extending cross member 16. A hollow vertical column 18 is rigidly mounted on the upper surface 14 of the stand. At the upper end of the column 18, a grinding wheel 20 is rigidly mounted on a rotatable shaft 22 which is suitably supported in bearings at the upper end of the column 18. A motor 24 is supported on the cross member 16 and is connected by a belt 26 to the shaft 22 of the grinding wheel 20.

Figure 2:
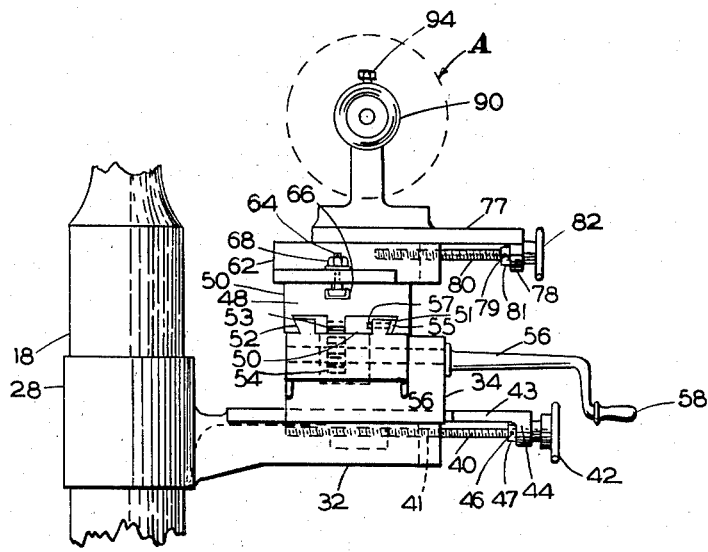
Fig. 2 is a side elevation, partially cut away, of the apparatus of Fig. 1.

In order to serve as a support for the work carriage which carries the reel being sharpened, and also to serve as a support for the parts associated with the work carriage, a collar 28 is slidably supported by the vertical column 18, as will best be seen in Fig. 2. The collar 28 may be supported by a bracket member positioned interiorly of the column 18 in a manner similar to that shown in the aforementioned Patent No. 1,667,064, Yerkey, the bracket member being provided with a screw-threaded hub member which is vertically movable on a screw-threaded shaft which extends vertically within the interior of the hollow standard 18. A hand wheel 30 (Fig. 1) is supported for rotation by the stand 10 and is in geared connection with the vertical threaded shaft in order to impart vertical motion in either an upward or downward direction to the collar 28. The details of the just-mentioned structure for elevating the collar 28 are not shown in the drawing since they form no part of this invention, and may be similar to the elevating mechanism shown in Patent No. 1,667,064.

Extending forwardly from the collar 28 is a horizontal bracket 32. A bed frame 34 is supported on the upper surface of the bracket 32. The lower portion of the bed frame 34 is provided with a dovetail groove 35 which engages the bracket 32 to thereby permit a lateral movement of the bed frame 32 toward or away from the column 18 and therefore toward or away from the grinding wheel 20 which is supported at the upper end of the column 18. A filler strip 36 is positioned between the engaging surfaces of the bracket member 32 and the bed frame 34 at the right-hand side of the dovetail groove, with respect to the view shown in Fig. 1, to avoid any undesirable looseness or play between the bed frame and the bracket member. The filler strip 36 is held in place by means of an adjusting screw 38.

In order to provide adjustment of the position of the bed frame 34 with respect to the bracket 32, a screw-threaded shaft 40 (see Fig. 2) is supported for rotation by a screw-threaded bore 41 in the bracket 32. The outer end of rod 40 terminates in a handle member 42. The bed frame 34 is provided with a forwardly extending projection 43 which terminates in a collar 44 surrounding the shaft 40. A pin member 46 passes through a bushing or stop member 47 on the shaft 40 adjacent the innermost end of the collar 44 to prevent any axial movement of the collar 44 with respect to shaft 40. It can be seen that as the shaft 40 is rotated by means of the handle 42 to cause a screw-threaded motion of the shaft 40 with respect to the bracket 32, the bed frame 34 moves laterally along the upper surface of bracket 32.

A work carriage 48 is positioned above the bed frame 34 and is provided on its underneath surface with a longitudinally extending groove 50 having laterally spaced inwardly inclined walls 51 which are in sliding engagement with tracks 52 which project upwardly from the upper surface of the bed frame 34. A filler strip 55 may be positioned between one of the walls 51 and one of the tracks 52 to prevent looseness between these members. The filler strip is held in place by an adjusting screw 57.

A rack member 53 is integrally attached to the underneath surface of the work carriage 48 substantially midway of the lateral width of the groove 50. Rack member 53 cooperates with a pinion gear 54 carried on a shaft 56 which is supported by the bed plate 34 in such manner that the pinion gear 54 is positioned directly beneath the rack member 53 and in mesh therewith. A handle 58 is rigidly attached to the outer end of shaft 56. When the handle member 58 is rotated to rotate pinion gear 54, the rotation of gear 54 causes a longitudinal movement of the work carriage 48 with respect to the bed frame 34.

The reel support units generally indicated at 59 and 60 are positioned on the work carriage 48 on opposite sides of the column 18. Each of the supporting units 59 and 60 comprises bracket portions 70 and 70' respectively and base portions 71 and 71' respectively. Each of the units 59 and 60 is supported on the work carriage 48 by means of a base plate 62. Each base plate 62 is bolted to the work carriage 48 by means of a bolt 64 having a head portion which is received in a longitudinally extending channel-shaped groove 66 of the work carriage 48, the bolt 64 being tightened in position by means of a nut 68. The groove 66 is closed from above by inwardly projecting surfaces which permit passage of the bolt 64 but do not permit upward movement of the nut 68. The groove 66 extends longitudinally along the upper surface of the work carriage 48 and the base plate 62 may be adjusted to any desired position along the work carriage by merely loosening the bolt and nut connection 64 and 68, shifting the base plate 62 to the desired position, and then retightening the bolt.

Each of the support units 59 and 60 is provided with oppositely disposed grooved lower edges 72 which are slidable along track 74 projecting from the upper surface of the respective base plates 62. A filler strip 75 is interposed between the engaging surfaces of the respective base plate 62 and the respective engaging edges 72, the filler strip 75 being held in position by means of an adjusting screw 76.

As will best be seen in Fig. 2, each of the supporting units 59 and 60 is provided with an extension 77 having a downwardly depending bearing collar 76 which is carried by a screw-threaded shaft 80 which is in screw-threaded engagement with the base plate 62. A pin 79 passes through a bushing or stop member 81 positioned on the shaft 80 adjacent the innermost end of collar 78 to prevent any axial movement of collar 78 relative to shaft 80. A handle member 82 is attached to the outer end of the shaft 80. By rotating the handle 82 to cause screw-threaded motion of shaft 80 with respect to the base plate 62, the respective reel support units 59 and 60 may be independently moved laterally inwardly or outwardly toward or away from the grinding wheel 20 as desired.

Figure 3:
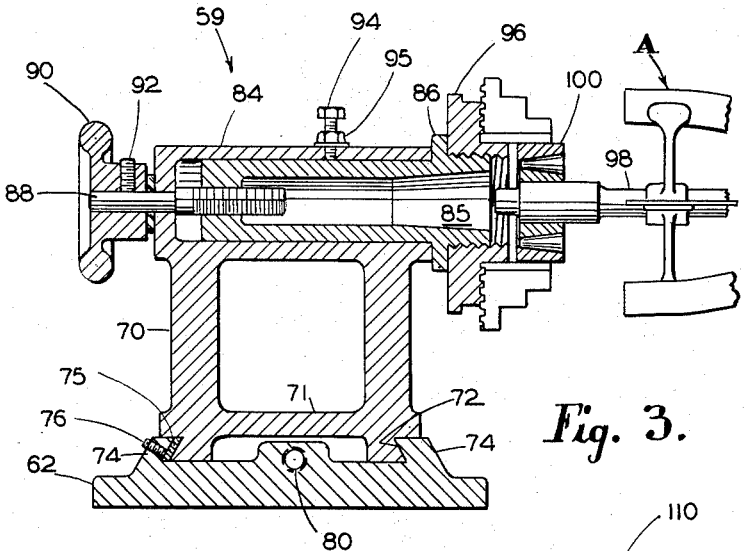
Fig. 3 is an enlarged vertical section of the reel supporting structure at the left-hand end of the apparatus with respect to the view shown in Fig. 1.

As will best be seen in Fig. 3, the upper portion of the bracket 70 carries a hollow sleeve 84 which extends horizontally and in alignment with the axis of the reel which is to be sharpened. A hollow spindle 86 is adapted to be received within the sleeve 84. Spindle 86 is provided at its left-hand end with respect to the view shown in Fig. 3 with a threaded hole into which a threaded shaft 88 is screwed. The shaft 88 extends through a passage at the outer or left-hand end of a sleeve 84. A handle 90 slips over the outer end of the shaft 88 and may be held in place by a set screw 92. The spindle 86 may be moved in or out of the sleeve 84 by turning shaft 88 by means of handle 90. This permits adjustment of the spacing between the reel bearings held by the oppositely disposed support units 59 and 60. To hold the spindle 86 in any desired adjusted position, a set screw 94 passes through a nut 95 which is brazed to the outer surface of sleeve 84 and through the sleeve 84 into engagement with the outer surface of the spindle 86.

The inner end of the spindle 86; that is, the end of the spindle disposed toward the opposite reel support unit, is provided with an external thread which is adapted to receive in threaded engagement a chuck 96.

Figure 4:
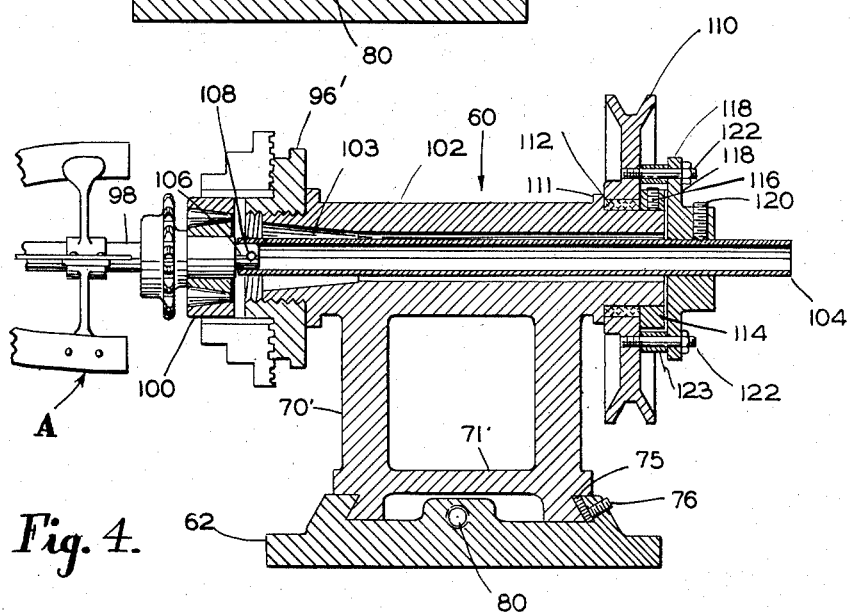
Fig. 4 is an enlarged view in vertical section of the reel supporting structure at the right-hand end of the grinding machine with respect to the view shown in Fig. 1.

As will best be seen in Fig. 4, the reel support at the right-hand end of the work carriage carries at the upper end of its bracket portion 70' a tubular sleeve 102 which is externally threaded at its inner end to receive a chuck 96'.

The reel A which is to be sharpened is provided at each of the outer ends of its shaft 98 with a roller bearing 100, the respective bearings 100 being supported by the chucks 96 and 96'.

A hollow spindle 104 extends lengthwise through the sleeve 102 of the support unit 60. The innermost end or left-hand end with respect to the view shown in Figs. 1 and 4 of the spindle 104 engages the reduced end portion 106 of reel shaft 98. A pin 108 passes through an aperture in the spindle 104 and through a passage in the shaft portion 106, thereby rigidly securing the spindle 104 to the reel shaft 98.

A pulley 110 having a bearing surface 112 is journaled for rotation on the right-hand end of the tubular portion 102. Axial displacement of the pulley 110 to the left, with respect to the view shown in Fig. 4, is prevented by a radially extending flange or collar 111 integral with the sleeve 102. A thrust collar 114 is secured to the outer end of the sleeve 102 to absorb the end thrust of the pulley 110 and to prevent axial displacement of the pulley 110. The thrust collar 114 is maintained in position by means of a set screw 116. A flanged collar 118 is secured to a portion of the tubular member 104 which projects beyond the sleeve 102, the flanged collar 118 being maintained in position on the tubular member 104 by means of a set screw 120. The flanged collar 118 is rigidly secured to the pulley 110 by means of bolts 122 which pass through spacers 123. A motor 124 is supported by the base portion of the support bracket 70'. The motor is connected by a belt 125 to the pulley 110.

To grind the blades of reel A, the reel is mounted with its opposite shaft bearings 100 supported by the oppositely disposed chucks 96 and 96'. The bed plate 34 and the work carriage 48 may be moved laterally toward the grinding wheel 20 until the grinding wheel makes the desired contact with the edges of the blades of the reel A. The motors 24 and 124 are energized to cause rotation of the grinding wheel 20 and the reel A respectively. The work carriage 48 may then be moved longitudinally either to the right or to the left by rotating the handle 58 to cause meshing engagement between the pinion gear 54 and the rack member 53. This causes the entire assembly mounted on the work carriage 48, including the reel A, and the supports 59 and 60, to be moved longitudinally with respect to the grinding wheel 20 while the reel A is rotating on its bearings 100. This insures that all of the blades of the reel A are ground uniformly to the same radial distance from the bearing center of the reel.

The manner in which the apparatus described hereinbefore may be used for sharpening the ledger bar blades of reel type lawn mowers is illustrated in Figs. 5–8 inclusive. To sharpen a ledger bar blade, the entire assembly supported by the bracket 32 is rotated 90 degrees from the position shown in Figs. 1–4. This is done by rotating the cylindrical collar member 28 with respect to the column 18. The cylindrical collar 28 is rotatable with respect to the supporting bracket disposed inside column 18 as shown in the aforementioned Patent No. 1,667,064, Yerkey.

In utilizing the apparatus to grind the ledger bar blade, the chucks 96 and 96' are removed from the left- and right-hand supporting brackets 70 and 70'. A pair of supporting brackets 126 are used to support the ledger bar B. Each of the brackets 126 is provided with a foot 128 which rests upon the upper surface of the work carriage 48. Each of the bracket members 126 has rigidly attached to it a tapered pin member 130 which is adapted to fit into the tapered throats 85 and 103 of the respective sleeve members 84 and 102 at the left- and right-hand ends of the work carriage respectively. Each support bracket 26 is of substantially F shape in side elevation, having an upper arm 132 provided at its outer end with a threaded socket 134, and a lower arm 136 provided with a pair of spaced sockets 138 and 140. The ledger bar B and its attached blade member 142 are disposed longitudinally between the upper and lower arms 132 and 136. The bar B is held at the proper height for grinding by an adjusting screw 144 which extends downwardly from the upper threaded socket 134 and by a pair of adjusting screws 146 and 148 which extend upwardly from the lower threaded sockets 138 and 140 respectively.

In grinding the blade of the ledger bar B, a grinding wheel 150 having a tapered edge 152 is substituted in place of the grinding wheel 20 used for grinding the reel blades.

The ledger bar blade is ground by reciprocating the work carriage 48 by means of the engagement between the rack member 53 and the pinion gear 54 by turning handle 58 as described hereinbefore.

It can be seen that there is provided in accordance with this invention a machine for grinding the movable and stationary blades of a reel type lawn mower which is relatively simple in construction and operation and yet which efficiently sharpens the blades of both the reel and ledger bar. The grinding apparatus of the invention insures that all of the reel blades are ground to the same radial distance from the bearing center of the reel and holds the ledger bar so that a bevel can be applied on the blade lip and so that the edges of the blade can be straightened.

While there has been shown and described a particular embodiment of the invention, it will be obvious to those skilled in the art that various changes and modifications can be made therein without departing from the invention and, therefore, it is aimed to cover all changes and modifications as fall within the true spirit and scope of the invention.

What I claim as my invention is:

1. A machine for grinding a lawn mover reel which is rotated on its own bearings during the grinding operation, said machine comprising an elongated work carriage, a first and second support means carried by and spaced longitudinally of said work carriage for receiving the opposite bearings of a lawn mower reel whereby said reel may be supported for rotation during the grinding operation; said first support means including a first upright bracket member, a first hollow sleeve supported by said first bracket member, a first spindle member coaxially positioned within said first hollow sleeve member, said spindle member being adjustable axially of said sleeve member toward or from said second support means, and a reel bearing supporting chuck member mounted on an end of said first spindle member; said second support means including a second upright bracket member, a second hollow sleeve supported by said second bracket member, a drive spindle carried by said second hollow sleeve, said drive spindle being connectible in driving relation with the shaft of a lawn mower reel having bearings supported by said first and second support means, and a reel bearing supporting chuck member mounted on an end of said second hollow sleeve; and means carried by said work carriage and connected to said drive spindle to rotate said drive spindle continuously during the grinding operation.

2. A machine for grinding a lawn mower reel which is rotated on its own bearings during the grinding operation, said machine comprising an elongated reciprocable work carriage, a first and second support means carried by said work carriage and spaced longitudinally of said work carriage for supporting the opposite bearings of a lawn mower reel whereby said reel may be rotated during the grinding operation; said first support means including a first upright bracket member, a first hollow sleeve supported by said first bracket member, a spindle member coaxially positioned and slidably movable within said first sleeve member, means connected to said spindle member to adjust said spindle member axially of said first sleeve member toward or from said second support means, and a reel bearing supporting chuck member mounted on an end of said first spindle member; said second support means including a second upright bracket member, a second hollow sleeve supported by said second bracket member, a drive spindle carried by said second hollow sleeve, said drive spindle being connectible in driving relation with the shaft of a lawn mower reel having bearings supported by said first and second support means, and a reel bearing supporting chuck member mounted on an end of said second sleeve; and means carried by said reciprocable work carriage and connected to said drive spindle to rotate said drive spindle continuously during the grinding operation.

3. A machine for grinding a lawn mower reel according to claim 2 wherein said means to rotate said drive spindle continuously includes a pulley rotatably supported by said second hollow sleeve, and a collar member rigidly attached to both said pulley and to said drive spindle to transmit motion from said pulley to said drive spindle.

References Cited in the file of this patent

UNITED STATES PATENTS

| | | |
|---|---|---|
| 350,351 | Danner et al. | Oct. 5, 1886 |
| 417,001 | Creigh | Dec. 10, 1889 |
| 657,905 | Lea | Sept. 11, 1900 |
| 1,243,241 | Ames | Oct. 16, 1917 |
| 1,513,527 | Arnold | Oct. 28, 1924 |
| 1,667,064 | Yerkey | Apr. 24, 1928 |
| 1,782,154 | Thomas | Nov. 18, 1930 |
| 1,820,777 | Calhoun | Aug. 25, 1931 |
| 1,953,146 | Wood | Apr. 3, 1934 |
| 1,955,636 | Kistner | Apr. 17, 1934 |
| 2,110,637 | Simmons et al. | Mar. 8, 1938 |